United States Patent [19]
Cardillo, IV et al.

[11] Patent Number: 6,101,252
[45] Date of Patent: Aug. 8, 2000

[54] CAS TONE DISGUISING METHOD AND APPARATUS

[75] Inventors: Raymond Anthony Cardillo, IV, Fairfax, Va.; Stephen D. Knight, Rochester, N.Y.

[73] Assignee: Nortel Networks Corporation, Ottawa, Canada

[21] Appl. No.: 08/829,082

[22] Filed: Mar. 31, 1997

[51] Int. Cl.[7] .................................................. H04M 11/00
[52] U.S. Cl. .................... 379/361; 379/93.09; 379/142; 379/252; 379/283
[58] Field of Search ..................... 379/361, 283, 379/353, 386, 93.09, 93.11, 93.17, 93.15, 93.16, 93.28, 252, 142, 211, 253, 254, 255, 256

[56] References Cited

U.S. PATENT DOCUMENTS

| | | | |
|---|---|---|---|
| 4,751,726 | 6/1988 | Hepp et al. | 379/106.02 |
| 5,493,609 | 2/1996 | Winseck, Jr. et al. | 379/93.09 |
| 5,519,774 | 5/1996 | Battista et al. | 379/386 |
| 5,574,777 | 11/1996 | Lewis | 379/142 |
| 5,583,922 | 12/1996 | Davis et al. | 379/93.09 |
| 5,583,924 | 12/1996 | Lewis | 379/142 |
| 5,649,002 | 7/1997 | Brady et al. | 379/142 |
| 5,836,009 | 11/1998 | Diamond et al. | 379/93.23 |
| 5,862,212 | 1/1999 | Mathews | 379/386 |

Primary Examiner—Forester W. Isen
Assistant Examiner—Jacques M. Saint-Surin
Attorney, Agent, or Firm—Jaeckle Fleischmann & Mugel, LLP

[57] ABSTRACT

The ADSI system 100 has a file stored in RAM 202 or ROM 204. The file plays a CAS tone. The CAS tone is disguised by playing one or more introductory tones as frequencies lower than the CAS tone. The user is conditioned to receive a CAS tone by ramping the CAS tone amplitude or increasing the amplitude in discrete steps.

49 Claims, 3 Drawing Sheets

CAS TONE DISGUISING METHOD AND APPARATUS

BACKGROUND

This invention generally relates to the field of voice and data services and in particular to a method and an apparatus for switching a telephone receiver between voice and data modes.

Analog display services interface (ADSI) enables alternate voice and data capability over existing analog telephone networks. ADSI is a telecommunications protocol standard developed by Bell Core and published in Bell Communications Research Report "Generic Requirements for and SPCS to Customer Premises Equipment Data Interface for analog display services," Technical Reference TR-NWT-001273, December, 1992 (incorporated herein by reference). This capability permits ADSI devices to communicate with users through a familiar voice response audio interface, where the user listens to voice recordings and makes menu selections using the telephone keypad, and with visual menus and information on a screen display, where service selections can be made using softkeys. Currently, ADSI devices are often implemented as screen-display telephone terminals, but there can also be television set-top boxes allowing users to make calls using the television, personal digital assistants (PDAs), pagers, and personal computers that are ADSI capable.

In addition to real-time interactive applications, ADSI also enables program transfer using a capability known as Feature Download. These programs, or service scripts, can be developed by a server and run on a local terminal. In many cases, these scripts are created by an authoring tool and stored in an external database for access by the telephony platform serving the user. Therefore, when new features are requested by the user, or are newly added by the server, the scripts are transferred by the telephony platform to the ADSI terminal where they are stored in memory and executed by the terminal until overwritten. These scripts define not only call flow, but also define the softkeys and displays presented to the user during a call.

One example of applied ADSI technology is Northern Telecom's Advanced Call Management Service (ACMS). In ACMS, customer selected features are stored in an external database. When a customer calls in for activation of services, a database lookup is performed so that the appropriate information for that customer can be downloaded to the telephone. The application runs on a computer telephony platform such as a Network Applications Vehicle (NAV), which is typically a UNIX-based telephony platform, and which reads an object file to get information concerning the call flow. The NAV presents the call flow, including ADSI commands, to the end user and as a result a new application is presented to the terminal.

In addition, any server may create Custom Local Area Signaling Services (CLASS)$^{SM}$ or Custom Calling Features (CCF) and download these advanced feature download scripts that are specifically tailored to the user's service subscription. As a result, a user can activate services such as three-way calling, call waiting, and call forwarding through context sensitive screen prompts and softkeys. These advanced call management telephony script applications have been a primary area of development for ADSI display terminals.

The ADSI device is capable of receiving data from the public or private computer network including analog voice data and digital data. In the course of using the ADSI device it is often necessary to switch the ADSI device one or more times between the analog and digital modes. Switching is accomplished to the digital mode by transmitting a Customer Premises Equipment Alerting Signal (CAS) that may comprise a short, 80 millisecond burst of one or more tones. A typical CAS dual tone burst consist of 2170 hertz and 2300 hertz. However, the CAS tone is very annoying and many customers complain about the CAS tone. The annoying CAS tone may inhibit both the sales and the use of ADSI devices. Customers complain that the CAS tone hurts their ears and that it is a piercing, sudden, unexpected and fairly loud noise. It is often loud because the tone must be broadcast at a large enough amplitude to reach the ADSI device farthest away from the NAV.

Others have addressed the problem by trying to minimize the occurrence of the CAS tone. That solution was implemented by a computer program stored in the computer telephony apparatus. The computer program was executed by the computer telephony platform to carefully keep track of when the ADSI phone was in the data mode. The softkeys of the ADSI phone can be programmed to put the phone into the data mode, and that avoids receiving a CAS tone. However, there are still instances when a softkey is not effective in switching the ADSI phone into the data mode and the only way to switch the ADSI phone is to play the CAS tone.

SUMMARY

We have discovered methods and a corresponding apparatus that will disguise or otherwise render a CAS tone less offensive to the user. One method is to play a sequence of tones that prepare the end user for the CAS tone. For example, the tones "do, re, mi" are well known and the user expects to hear the "mi" tone after "re". The inventive method relies upon setting the pitch and the amplitude low to play a "do" and then work up the musical scale to the higher "mi". For the "mi" tone, the invention plays the CAS tone. While the CAS tone is still played, its presence is less annoying since the user is conditioned to expect tones of increasing frequency and/or amplitude.

Still another solution to the problem is to play a CAS tone that changes its amplitude in either a fixed or a step-wise manner. In one embodiment, the CAS tone is increased to a first level where it is held to give the ADSI receiver time to detect it. If it is not detected within a fixed amount of time, the amplitude is increased to a second level where it is held to allow the ADSI phone to detect the CAS tone. This ramp or step-wise increase is repeated until the CAS tone is recognized.

The invention also contemplates combining the sequence and ramp or step-wise increasing features together to provide different solutions that are within the skill of those knowledgeable in the art.

Those skilled in the art will appreciate that the CAS tone is stored as an audio file stored on the computer telephony platform. A CAS tone is played by the computer telephony platform and sent to the ADSI phone in order to switch the ADSI phone from voice to data mode. In the invention, the audio file for the CAS tone is modified to include a sequence of tones such as the "do, re, mi" sequence indicated above or the ramp or step-wise sequence or any combination of the tone and ramp or step wise sequence.

More particularly, the invention provides a method and apparatus for operating a computer telephony platform that includes the steps of receiving a call from a ADSI telephone that is switchable between a first mode for receiving analog information and a second mode for receiving digital information. The next step is generating a CAS tone to switch the telephone to the second mode for receiving digital information. The ADSI phone then responds to the CAS tone with a dual tone multifrequency (DTMF) A digit signal. The step of generating a CAS tone includes generating a sequence of two or more tones that include the CAS tone in the sequence. In the preferred embodiment there are three tones and the CAS tone is the last tone in the sequence. In particular, the sequence tones include tones that are at frequencies lower than a CAS tone. In the preferred "do, re, mi" example, there are three tones and sequential tones are separated from each other by a whole step. It is also possible to disguise the CAS tone by simultaneously generating other tones and mixing the CAS tone with one or more other tones to render the CAS tone more pleasing to the human ear.

In its more general aspects, the invention provides for sound conditioning a user of an ADSI phone to expect a CAS tone and/or disguising the CAS tone. One method of conditioning the user includes ramping the amplitude of the CAS tone until the CAS tone is recognized. The ramp may be conducted in several steps between increasingly higher levels. As an alternative, the CAS tone could be step-wise increased in amplitude.

DETAILED DESCRIPTION

Reference will now be made in detail to the present preferred embodiments of the invention, examples of which are illustrated in the accompanying drawings. Wherever possible, the same reference numbers will be used throughout the drawings to refer to the same or like parts.

A. The System

Figure 1:
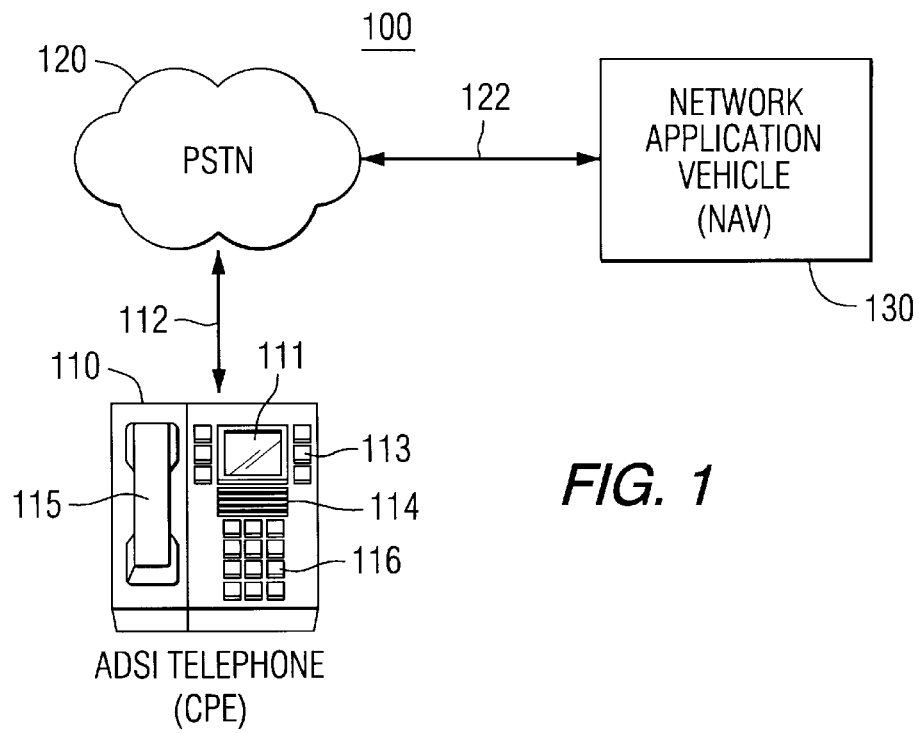
FIG. 1 is a block diagram showing a system consistent with the present invention.
Figure 2:
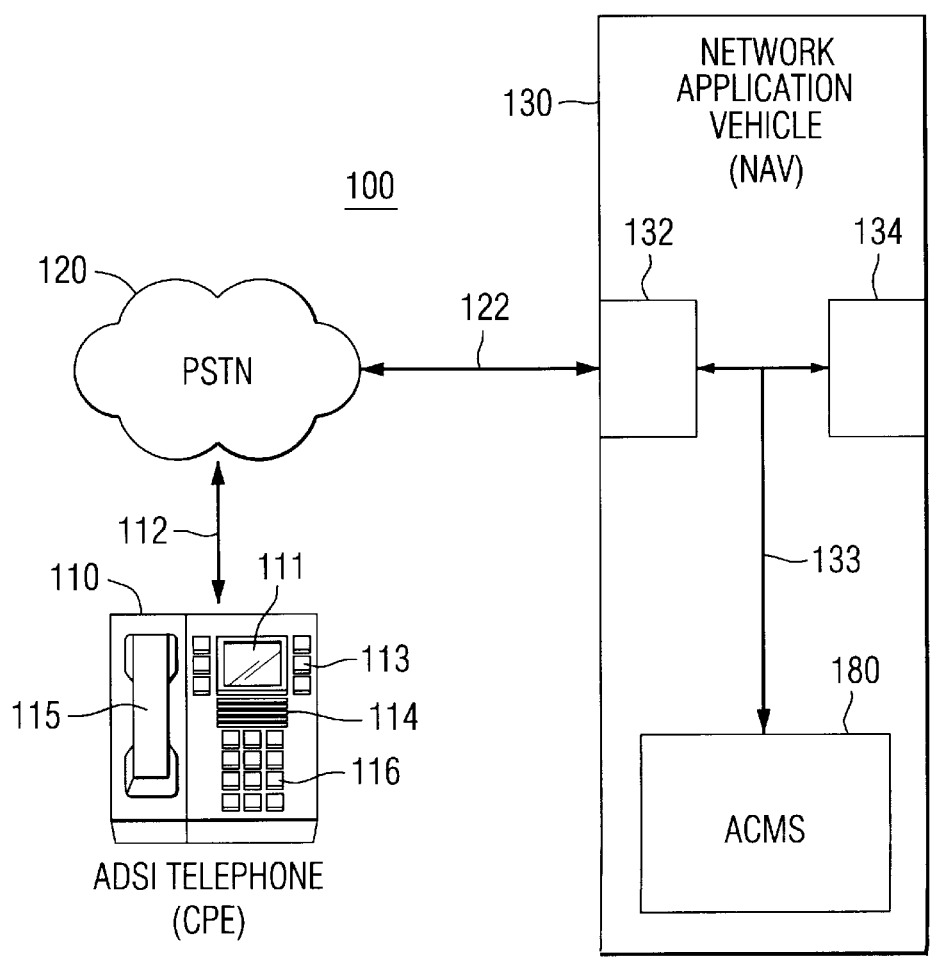
FIG. 2 is a block diagram showing further details of the system of FIG. 1.

FIGS. 1 and 2 are block diagrams showing an ADSI-based system 100 consistent with the present invention. FIG. 1 shows the overall make-up of the system 100, while FIG. 2 shows a more detailed layout of the system 100. A telephone terminal, such as an ADSI screen-display telephone terminal 110 or other suitable Customer Premise Equipment (CPE), having an integrated screen-display 111, is connected to public switched telephone network (PSTN) 120 that routes calls and data transfers from terminal 110 to the Network Application Vehicle (NAV) 130 via standard telephone interface lines 112 and 122. NAV 130 is a telephony platform server for controlling call and data flow between the terminal 110 and the Advanced Call Management Server 180, an ADSI protocol specific browser that can retrieve data files and format the data file to an ADSI protocol formatted data display block for display onscreen-display 111. NAV 130 also contains a memory device 132 for receiving and storing protocol messages, and a memory device 134 for storing data files and messages.

Terminal 110 may be any ADSI compatible device, or other screen-display telephone terminal, capable of receiving and storing upgrade command files, service scripts, and transmitted data from NAV 130 through PSTN 120. One example is Nortel's Power Touch 350, which includes an 8×20 character LCD screen-display 111, a series of programmable softkeys 113 for a user's selection of a particular data file or other displayed functions, standard telephone speaker 114, handset 115, and a standard 12 character telephone key pad 116.

Terminal 110 communicates with NAV 130 by standard transmission of ADSI protocol transmission signals along line 112, PSTN 120, and line 122. The ADST protocol transmission signals may include, but are not limited to, Dual Tone Multifrequency (DTMF) signals. For a more detailed description of ADSI communication signal requirements, refer to Bell Communications Research report "Generic Requirements for an SPCS to Customer Premises Equipment Data Interface for Analog Display Services," Technical Reference TR-NWT-001273. December 1992 (incorporated herein by reference).

NAV 130 may be any telephony platform capable of retrieving, storing, and transmitting both data and command files. In the present embodiment, and by way of example only, NAV 130 can be a UNIX-based ADSI capable platform implemented through well-known hardware, but with specific software functions described herein for the present invention. NAV 130 includes a UNIX-based processor, and a number of internal memory locations including, a first memory 132 for receiving and storing data files and messages transmitted from terminal 110, and a second memory 134 for receiving data files. NAV 130 also includes ACMS 180 which is connected to memory devices 132 and 134 via data bus 133. In addition, as further described below, NAV 130 controls the call flow and data transfers between the ACMS 180 and terminal 110. NAV 130 also allows a service provider to create and store ADSI data tiles written in a markup language specifically formatted for screen-display telephone terminals.

Figure 3:
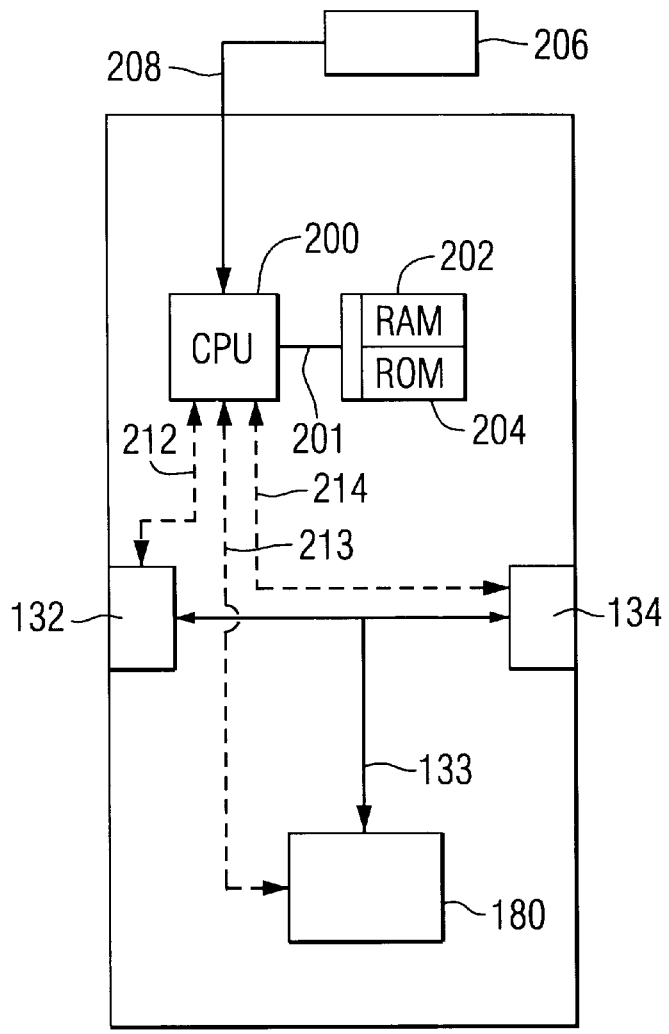
FIG. 3 is a further detail block diagram showing the details of the computer telephony platform of FIG. 2.

Turning to FIG. 3, further details of the NAV 130 are shown. The computer telephony platform has a central processing unit 200 that communicates via a bus 201 with random access memory (RAM) 202 and read only memory (ROM) 204. The ROM 204 stores permanent instructions for the CPU 200 such as its operating system. The RAM 202 stores further instructions including application programs and selected files such as a CAS tone file. CPU 200 can be controlled through a suitable input device 206 such as a keyboard or a mouse. The keyboard or mouse 206 is coupled to CPU 200 through a control line 208. CPU 200 also accesses and controls memories 132, 134 and the ACMS 180 via respective control lines 212, 214 and 213. In operation, the NAV 130 is in communication with the ADSI telephone 110 through the PSTN 120. Let us assume that the communication channel is initially open for voice transmission and that the NAV 130 now wishes to transmit digital data to the ADSI telephone 110. In order to switch the ADSI telephone 110 into its digital data receiving mode, the NAV 130 retrieves a CAS tone file stored in either the RAM 202 or the ROM 204. The CPU 200 then reads the CAS tone file and generates a CAS tone that is played over the trunk lines 122 and 112 for receipt by the ADSI phone 110. When the ADSI phone 110 detects the CAS tone, it generates a recognition signal. In the preferred embodiment, the recognition signal is a dual tone multifrequency (DTMF) signal corresponding to the A digit of the ADSI keypad 116. When the NAV 130 detects the DTMF A signal, it begins transmitting digital data to the ADSI 110.

The CAS tone file is one of a number of files stored in either the RAM 202 or the ROM 204. Those memories hold tone files including the CAS tone file. The invention modifies the CAS tone file to condition the user to expect the high frequency CAS tone.

Turning to FIGS. 4A–4D, there are shown four graphic descriptions of different embodiments of the invention. In the embodiment shown in FIG. 4A, the CAS tone file is modified to include three tones, TN1, TN2, and TN3. The three tones are played in sequential order beginning with TN1 and ending with TN3. The TN3 tone corresponds to the CAS tone. The tones TN1, TN2 and TN3 are spaced apart by a whole step on the western diatonic scale. This scale has eight notes to an octave and includes a pattern of whole and half steps. When three notes are sequentially played with a whole step between sequential notes, the sequence of notes generates the familiar pattern of "do", "re" and "mi". Most users recognize this sequence of notes and expect that the third note in the sequence will be at a frequency significantly higher, i.e. at least two steps, than the frequency of the initial note. In this manner, the user is conditioned to expect the pitch of the tones to increase in frequency over time and will not be surprised and annoyed by the high frequency CAS tone that corresponds to TN3.

Figure 4A:
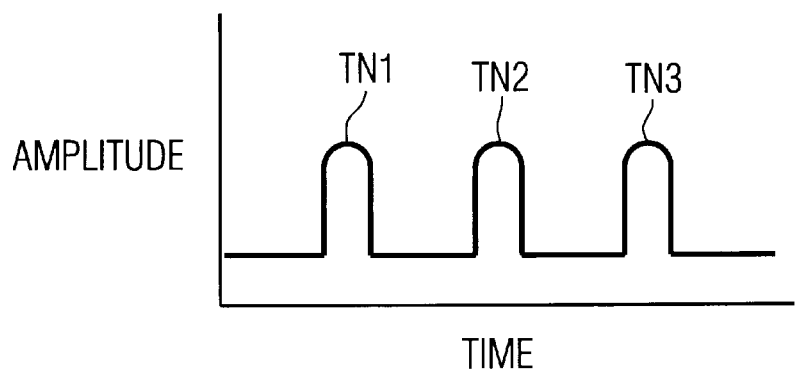
FIGS. 4a–4d show various embodiments of the resulting CAS tone file generated and played by the computer telephony platform of FIG. 3.
Figure 4B:
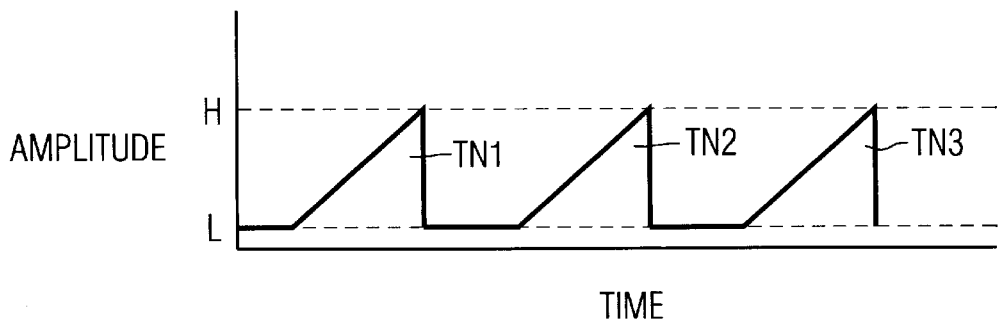

The sequential tone file that is played to condition and/or disguise the CAS tone may be further modified to gradually increase the amplitude of each of the sequential tones. This embodiment of the invention is illustrated in FIG. 4B. There, the initial tone TN1 is gradually increased in amplitude from an initial level L to a final level H. After playing the tone TN1 there may be a brief delay followed by playing the tone TN2. Again, the tone TN2 is gradually increased from an initial value L to a final value H. The third tone, TN3, is the CAS tone and it also increases from an initial low amplitude level L to a high amplitude level H. The time between tones is adjustable and may be made longer or shorter or maybe entirely eliminated in accordance with the desired operation of the CAS tone disguising system.

Figure 4C:
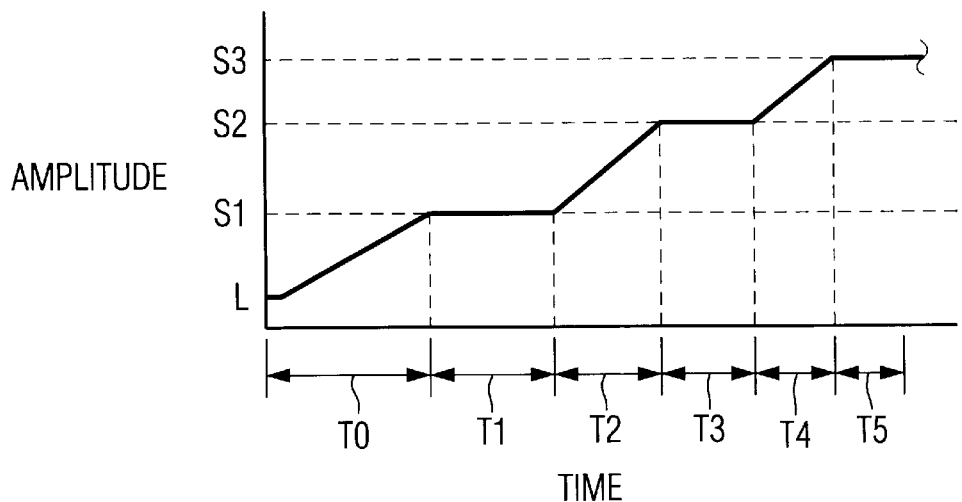

The invention also contemplates playing the CAS tone at different levels of amplitude in order to condition the user to expect the high volume, high frequency of the CAS tone. An example of this embodiment of the invention is shown in FIG. 4C. There the CAS tone is initially played at a low amplitude, L and is gradually increased to a first level, S1. The CAS tone is held at the level S1 while the NAV 130 listens for the DTMFA signal. If the signal is not given or detected within the time period T1, the amplitude of the CAS tone is increased at a uniform rate to level S2 during the time T2. The NAV 130 again waits to receive the DTMFA signal for a time T3. If it does not detect a DTMFA signal within the time T3, it increases the amplitude of the CAS tone again to the level S3. This sequence of periodic ramped increases of the CAS tone is repeated until the ADSI telephone 110 responds with a DTMFA signal. When the NAV 130 detects the DTMFA signal, the CAS tone is terminated and digital data is transmitted to the ADSI phone 110.

Figure 4D:
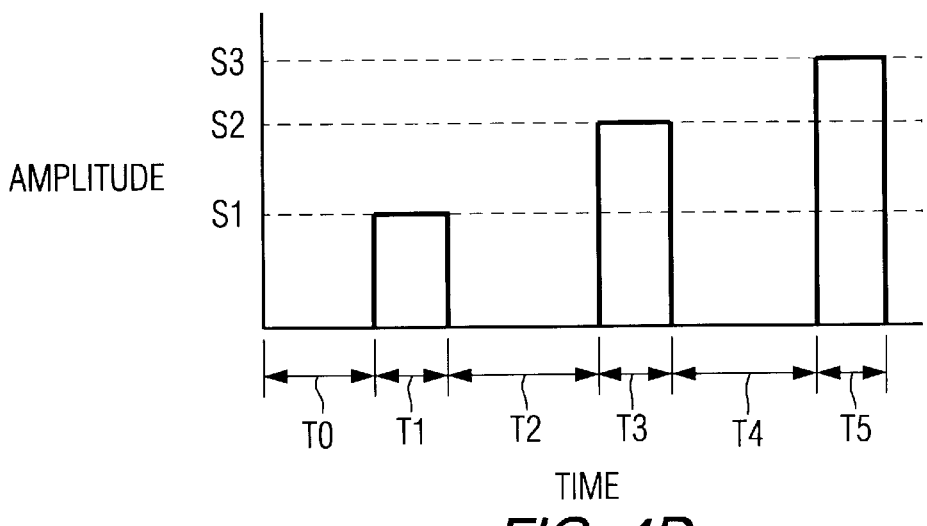

Still another embodiment of the invention is shown at FIG. 4D. There, the CAS tone is played at discreet levels for an initial time period T0. Then the CAS tone is turned off and the NAV 130 listens for the DTMFA signal during the time T1. If the NAV 130 does not receive the DTMFA signal during the time T1 it generates another CAS tone at a higher amplitude S2 for a time t2. After terminating the CAS tone at the amplitude S2, the NAV 130 waits for a time T3 to receive the DTMFA signal. If no DTMFA signal is received in the time T3, the CAS tone is again generated at a higher amplitude S3. The foregoing sequences repeat until the ADSI phone 110 generates a DTMFA signal. Upon generating and detection of the DTMFA signal by NAV 130, the NAV 130 transmits digital data to the ADSI telephone 110.

It is also a feature of the invention that the NAV 130 stores the last successful CAS sequence that produces a DTMFA response from a particular ADSI device 110. The next time that particular device is called, the NAV 130 initially uses the last successful CAS tone. For example, if the second step amplitude S2 was successful in switching a particular ADSI device 110 to the data mode, then the next time that ADSI device is called NAV 130 plays the CAS tone at the S2 step level.

Having thus described the preferred embodiments of the invention, those skilled in the art will appreciate that further modification, additions, deletions, and combinations of the preferred embodiments may be made without departing from the spirit of the scope of the invention as set forth in the following claims:

What is claimed is:

1. A method for operating a computer telephony platform comprising the steps of:

receiving a call from a telephone that is switchable between a first mode for receiving analog information and a second mode for receiving digital information;

generating a CAS tone to switch the telephone to the second mode for receiving for receiving digital information;

responding to the CAS tone with a DTMFA signal;

the step of generating a CAS tone including generating a sequence of two or more tones of different frequencies followed by a CAS tone for switching from voice to data or from data to voice.

2. The method of claim 1 wherein the sequence of tones is pleasing to the human ear.

3. The method of claim 1 wherein the sequence of two or more tones followed by a CAS tone are at frequencies lower than the CAS tone.

4. The method of claim 1 wherein the frequency of each tone in the sequence prior to the CAS tone is greater than the prior tone in said sequence.

5. The method of claim 1 wherein the frequency of each tone in the sequence before the CAS tone differs from a prior or subsequent tone of the sequence by a whole step.

6. The method of claim 1 wherein the sequence of tones is played within a set time frame.

7. The method of claim 1 wherein the sequence of tones includes single frequency tones.

8. The method of claim 1 wherein the sequence of tones comprises multifrequency tones.

9. The method of claim 1 wherein the CAS tone is embedded in another sound.

10. The method of claim 9 wherein the CAS tone is added to one or more single or multifrequency tones.

11. The method of claim 9 wherein the telephone responds to a CAS tone at or above a threshold amplitude and the CAS tone is not masked by the amplitude of other tones.

12. The method of claim 9 wherein the CAS tone exceeds the threshold amplitude.

13. A method for operating a computer telephony platform comprising the steps of:

receiving a call from a telephone that is switchable between a first mode for receiving analog information and a second mode for receiving digital information;

generating two or more tones in sequence suitable for warning an end user that a CAS tone is coming, and then generating a CAS tone to switch the telephone to the second mode for receiving digital information;

responding to the CAS tone with a DTMFA signal;

prior to or simultaneously with the step of generating the CAS tone, mixing the CAS tone with one or more other tones to render the CAS tone more pleasing to the human ear.

14. The method of claim 13 wherein the step of generating the CAS tone includes generating one or more sequential tones of one or more amplitudes prior to the generation of the CAS tone to condition the human ear to receive the CAS tone.

15. A method for operating a computer telephony platform comprising the steps of:

receiving a call from a telephone that is switchable between a first mode for receiving analog information and a second mode for receiving digital information;

generating a CAS tone to switch the telephone to the second mode for receiving digital information;

responding to the CAS tone with a DTMFA signal;

sound conditioning a user of the telephone and/or disguising the CAS tone.

16. The method of claim 15 wherein the step of disguising the CAS tone comprises the step of increasing the amplitude of the CAS tone until it is recognized by the telephone.

17. The method of claim 16 wherein the step of increasing the CAS tone comprises increasing the amplitude at a fixed rate of change.

18. The method of claim 16 wherein the step of increasing the CAS tone comprises increasing the amplitude at a variable rate of change.

19. The method of claim 16 wherein the step of increasing the CAS tone comprises increasing the amplitude to one or more fixed step increases.

20. The method of claim 16 wherein the step of increasing the CAS tone comprises sequentially increasing the amplitude at a first rate of change to a first level and repeating the steps of increasing the amplitude at said first rate to one or more subsequent levels until the telephone recognizes the CAS tone.

21. A method for operating a computer telephony platform comprising the steps of:

receiving a call from a telephone that is switchable between a first mode for receiving analog information and a second mode for receiving digital information;

generating a CAS tone to switch the telephone to the second mode for receiving digital information;

responding to the CAS tone with a DTMFA signal;

ramping the amplitude of the CAS tone until it is recognized.

22. The method of claim 21 wherein there is a sequence of tones and ramping the amplitude of one or more tones in the sequence, including the CAS tone, until the telephone recognizes the CAS tone.

23. The method of claim 22 wherein all tones are ramped.

24. The method of claim 21 wherein the CAS tone is increased in amplitude by two or more amplitude steps.

25. The method of claim 22 wherein the step of increasing the CAS tone comprises sequentially increasing the amplitude at a first rate of change to a first level and repeating the steps of increasing the amplitude at said first rate to one or more subsequent levels until the telephone recognizes the CAS tone.

26. The method of claim 21 wherein the CAS tone is increased slow enough to not hurt the user.

27. A method for operating a computer telephony platform comprising the steps of:

receiving a calling signal from a telephone at a first location, said telephone switchable between a first mode for receiving analog information and a second mode for receiving digital information;

generating a CAS tone to switch the telephone to the second mode for receiving digital information;

responding to the CAS tone with a DTMFA signal;

recognizing the location of the calling signal and generating a CAS tone at an amplitude in accordance with the location of the telephone.

28. The method of claim 27 comprising the further step of remembering the history of calls from said telephone at said first location and generating a CAS tone in accordance with the amplitudes of prior CAS tones sent to said telephone.

29. The method of claim 28 comprising the step of increasing the amplitude of the CAS tone by a fixed rate by discrete steps or by a combination of a fixed rate and discrete steps.

30. A computer telephony platform comprising:

means for receiving a call from a telephone that is switchable between a first mode for receiving analog information and a second mode for receiving digital information;

means for conditioning a user of the telephone and/or disguising the CAS tone;

means for generating a CAS tone to switch the telephone to the second mode for receiving digital information.

31. The computer telephony platform of claim 30 wherein the means for conditioning a user of the telephone comprises means for generating a sequence of single or multifrequency tones with the CAS tone included in the last tone(s) of the sequence.

32. The computer telephony platform of claim 30 wherein the sequence includes three tones.

33. The computer telephony platform of claim 30 wherein the CAS tone is the last tone in the sequence.

34. The computer telephony platform of claim 30 wherein the sequence of tones is pleasing to the human ear.

35. The computer telephony platform of claim 30 wherein tones other than the CAS are at frequencies lower than the CAS tone.

36. The computer telephony platform of claim 30 wherein the frequency of each tone is greater than the prior tone in said sequence.

37. The computer telephony platform of claim 30 wherein the frequency of each tone in the sequence differs from a prior or a subsequent tone by a whole step.

38. The computer telephony platform of claim 30 wherein sequence of tones is played within a set time frame.

39. The computer telephony platform of claim 30 wherein the sequence of tones includes single frequency tones.

40. The computer telephony platform of claim 30 wherein the sequence of tones comprises multifrequency tones.

41. The computer telephony platform of claim 30 wherein the CAS tone is embedded in another sound.

42. The computer telephony platform of claim 30 wherein the CAS tone is added to one or more single or multifrequency tones.

43. The computer telephony platform of claim 30 wherein the telephone responds to a CAS tone at or above a threshold amplitude and the CAS tone is not masked by the amplitude of other tones.

44. The computer telephony platform of claim 30 wherein the CAS tone exceeds the threshold amplitude.

45. The computer telephony platform of claim 30 wherein the means for disguising the CAS tone comprises means for increasing the amplitude of the CAS tone until it is recognized by the telephone.

46. The computer telephony platform of claim 30 wherein the means for increasing the CAS tone comprises means for increasing the amplitude at a fixed rate of change.

47. The computer telephony platform of claim 30 wherein the means for increasing the CAS tone comprises means for increasing the amplitude at a variable rate of change.

48. The computer telephony platform of claim 30 wherein the means for increasing the CAS tone comprises means for increasing the amplitude to one or more fixed step increases.

49. The method of claim 16 wherein the means for increasing, the CAS tone comprises means for sequentially increasing the amplitude at a first rate of change to a first level and means for repeating the step of increasing the amplitude at said first rate to one or more subsequent levels until the telephone recognizes the CAS tone.

* * * * *